(12) United States Patent
Tazoe

(10) Patent No.: US 8,377,588 B2
(45) Date of Patent: Feb. 19, 2013

(54) CELL ELECTRODE PLATE AND PROCESS FOR PRODUCING THE SAME

(75) Inventor: Nobuhiro Tazoe, Tokyo (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 0 days.

(21) Appl. No.: 13/190,801

(22) Filed: Jul. 26, 2011

(65) Prior Publication Data

US 2011/0277287 A1    Nov. 17, 2011

Related U.S. Application Data

(62) Division of application No. 10/585,650, filed as application No. PCT/JP2005/000895 on Jan. 25, 2005, now Pat. No. 8,007,939.

(30) Foreign Application Priority Data

Jan. 28, 2004 (JP) ................... 2004-019415

(51) Int. Cl.
*H01M 4/02* (2006.01)
*B32B 37/00* (2006.01)

(52) U.S. Cl. .......................... 429/209; 156/60
(58) Field of Classification Search ............ 429/209; 156/60
See application file for complete search history.

(56) References Cited

U.S. PATENT DOCUMENTS

| 5,448,901 A | 9/1995 | Yu et al. | |
| 6,027,835 A * | 2/2000 | Fukumura et al. | 429/233 |
| 6,146,694 A | 11/2000 | Reimers et al. | |
| 6,416,904 B1 * | 7/2002 | Reimers et al. | 429/231.95 |
| 6,423,446 B1 | 7/2002 | Miyazaki et al. | |
| 2001/0012588 A1 | 8/2001 | Kaido et al. | |
| 2005/0008778 A1 | 1/2005 | Utsugi et al. | |
| 2005/0031961 A1 | 2/2005 | Tsunekawa et al. | |

FOREIGN PATENT DOCUMENTS

| JP | 59-183910 | | 10/1984 |
| JP | 8 287953 | | 11/1996 |
| JP | 08287953 | A * | 11/1996 |
| JP | 9 274909 | | 10/1997 |
| JP | 10 12220 | | 1/1998 |
| JP | 11 3701 | | 1/1999 |
| JP | 11 176424 | | 7/1999 |
| JP | 11 185737 | | 7/1999 |
| JP | 2000 208134 | | 7/2000 |
| JP | 2003 162999 | | 6/2003 |

* cited by examiner

*Primary Examiner* — Karie O'Neill Apicella
(74) *Attorney, Agent, or Firm* — Oblon, Spivak, McClelland, Maier & Neustadt, L.L.P.

(57) ABSTRACT

A cell electrode plate is constituted by band-like core member made of metal foil and a plurality of sheets of electrode active material applied discontinuously on and longitudinally of at least one of upper and lower surfaces of the core member, the mutually adjacent sheets of the electrode active material having mutually different end positions widthwise of the core member. Thereby, an increase in worn amount of surfaces of press rolls is prevented when the cell electrode plate is pressed by a roll press machine with the press rolls so as to prolong the service life of the press rolls. Thus, the number and/or amount of grinding the press rolls is reduced to reduce the roll maintenance cost and enhance production efficiency.

6 Claims, 3 Drawing Sheets

CELL ELECTRODE PLATE AND PROCESS FOR PRODUCING THE SAME

CROSS REFERENCE TO RELATED APPLICATIONS

This application is a divisional of U.S. application Ser. No. 10/585,650, filed on Jul. 7, 2006, and is based upon and claims the benefit of priority to International Application No. PCT/JP05/00895, filed on Jan. 25, 2005 and from the prior Japanese Patent Application No. 2004-019415 filed on Jan. 28, 2004. The entire contents of each of these documents are incorporated herein by reference.

TECHNICAL FIELD

The present invention relates to a cell electrode plate and a process for producing the same.

BACKGROUND ART

Conventionally, in production of a cell electrode such as lithium-cell positive pole member, electrode mixture or positive pole active material such as $LiCoO_2$ is applied and dried on a core member or collector made of metal foil such as aluminum foil and is pressed by a roll press machine with press rolls so as to enhance bulk density of the positive pole active material.

The cell electrode plate thus produced by applying and drying electrode active material such as positive pole active material on the core member is shown in FIGS. 1 and 2 wherein reference numeral 1 denotes a band-like core member or collector made of metal foil such as aluminum foil with substantially uniform width; 2, electrode active material such as positive pole active material applied and dried in the form of sheets on upper and lower surfaces of the core member 1. The core member 1 and the electrode active material 2 provide a cell electrode plate 3. The sheets of electrode active material 2 are of uniform size and are arranged discontinuously on and longitudinally of the core member 1, widths of the core member 1 and the sheets of electrode active material 2 being W and W0, respectively. Distance between a widthwise end of the core member 1 and a corresponding widthwise end of each sheet of the electrode active material 2 is substantially uniform in a lot and is (W−W0)/2 so that the widthwise ends of the sheets of the electrode active material 2 are aligned with each other longitudinally of the cell electrode plate 3.

Pressing of the cell electrode plate 3 shown in FIGS. 1 and 2 by press rolls of a roll press machine is shown in FIGS. 3 and 4 in which reference numeral 4 denotes the roll press machine with the pair of upper and lower press rolls 5 and 6. The cell electrode plate 3 is pressed while passing through the press rolls 5 and 6, the electrode active material 2 being compressed for enhancement of its bulk density.

A prior document on application of electrode active material on a core member made of metal foil is, for example, Reference 1; and a prior document on pressing of electrode active material by press rolls of a roll press machine for enhancement of its bulk density is, for example, Reference 2.
[Reference 1] JP 9-274909 A
[Reference 2] JP 11-3701 A

SUMMARY OF THE INVENTION

Problems to be Solved by the Invention

The sheets of electrode active material 2 applied discontinuously on and longitudinally of the core member 1 have uniform width W0 in a lot and the widthwise ends of the sheets of electrode active material 2 are substantially aligned with each other longitudinally of the cell electrode plate 3. As a result, when pressed by the roll press machine 4, the widthwise ends of the sheets of electrode active material 2 abut at substantially the same positions on the press rolls 5 and 6 which are adjacent to the widthwise ends of the rolls.

However, the electrode active material 2 dried is hard in hardness so that pressing of the cell electrode plate 3 by the roll press machine 4 causes the surfaces of the press rolls 5 and 6 at positions X (see FIGS. 4 and 5) on which the widthwise ends of the sheets of active material 2 abut to be worn greatly (only the press roll 5 is shown in FIG. 5), eventually resulting in failure of smooth pressing of the cell electrode plate 3. As a result, conventionally the number of grinding the press rolls is increased, leading to increase in roll maintenance cost and reduction in production efficiency. Such circumstances do not change even if the electrode active material is applied by an apparatus of Reference 1 and pressing is conducted by an apparatus of Reference 2.

In view of the above, the invention has its object to make it possible to press by roll press machine a cell electrode plate comprising a core member made of metal foil and electrode active material applied and dried thereon, without causing the surfaces of the press rolls at positions adjacent to axial ends thereof to be worn greatly, so as to prolong a service life of the press rolls, whereby the number and/or amount of grinding the press rolls is reduced to reduce the roll maintenance cost and enhance the production efficiency.

Means or Measure for Solving the Problems

The invention is directed to a cell electrode plate comprising a band-like core member made of metal foil and a plurality of sheets of electrode active material applied discontinuously on and longitudinally of at least one of upper and lower surfaces of the core member, characterized in that at least one of the sheets of electrode active material has end positions widthwise of the core member which are different from end positions of the other sheets of electrode active material widthwise of the core member.

The invention is directed also to a cell electrode plate comprising a band-like core member made of metal foil and a plurality of sheets of electrode active material applied discontinuously on and longitudinally of at least one of upper and lower surfaces of the core member, characterized in that the mutually adjacent sheets of electrode active material have mutually different end positions widthwise of the core member.

In a cell electrode plate according to the invention, the sheets of electrode active material may have substantially uniform width or different widths. Alternatively, some of the sheets may have substantially uniform width and the other sheets may have different widths.

The invention is directed also to a cell electrode plate comprising a band-like core member made of metal foil and a plurality of sheets of electrode active material applied discontinuously on and longitudinally of at least one of upper and lower surfaces of the core member, characterized in that a predetermined sheet or sheets of electrode active material respectively has one and the other ends longitudinally of the core member which have different widths.

The invention is directed also to a cell electrode plate comprising a band-like core member made of metal foil and a plurality of sheets of electrode active material applied discontinuously on and longitudinally of upper and lower surfaces of the core member, characterized in that the sheets of electrode active material oppositely on the upper and lower surfaces of the core member have different end positions widthwise of the core member.

In a cell electrode plate according to the invention, the sheets of electrode active material oppositely on the upper and lower surface of the core member may have substantially uniform width or may have different widths.

The invention is directed to a process for producing a cell electrode plate comprising a band-like core member made of metal foil and a plurality of sheets of electrode active material applied discontinuously on and longitudinally of at least one of upper and lower surfaces of the core member, characterized in that at least one of the sheets of electrode active material has end positions widthwise of the core member which are different from end positions of the other sheets of electrode active material widthwise of the core member to thereby provide the sheets of electrode active material on said core member.

The invention is directed also to a process for producing a cell electrode plate comprising a band-like core member made of metal foil and a plurality of sheets of electrode active material applied discontinuously on and longitudinally of at least one of upper and lower surfaces of the core member, characterized in that the mutually adjacent sheets of electrode active material have mutually different end positions widthwise of the core member to thereby provide the sheets of electrode active material on said core member.

The invention is directed also to a process for producing a cell electrode plate comprising a band-like core member made of metal foil and a plurality of sheets of electrode active material applied discontinuously on and longitudinally of at least one of upper and lower surfaces of the core member, characterized in that a predetermined sheet or sheets of electrode active material respectively has one and the other ends longitudinally of the core member which have different widths to thereby provide the sheets of electrode active material on said core member.

The invention is directed also to a process for producing a cell electrode plate comprising a band-like core member made of metal foil and a plurality of sheets of electrode active material applied discontinuously on and longitudinally of at least one of upper and lower surfaces of the core member, characterized in that the sheets of electrode active material oppositely on the upper and lower surfaces of the core member have different end positions widthwise of the core member to thereby provide the sheets of electrode active material on said core member.

Effects of the Invention

According to a cell electrode plate and a process for producing the same of the invention, the following excellent effects and advantages may be obtained. When a cell electrode plate comprising a core member made of metal foil and sheets of electrode active material applied on the core member is pressed by a roll press machine, the respective widthwise ends on sheets of electrode active material abut at different positions on press rolls, so that the worn amount of surfaces of the press rolls by the widthwise ends of the sheets of electrode active material is not great. As a result, the service life of the press rolls can be prolonged to reduce the number and amount of grinding the press rolls, thereby reducing the roll maintenance cost and enhancing the production efficiency.

EXPLANATION OF THE REFERENCE NUMERALS

1 Core member made of metal foil
2 electrode active material (sheets of electrode active material)
3 cell electrode plate
W1, W2, W3, W4 and W5 widths

BEST MODE FOR CARRYING OUT THE INVENTION

Embodiments of the invention will be disclosed in conjunction with attached drawings.

Figure 1:
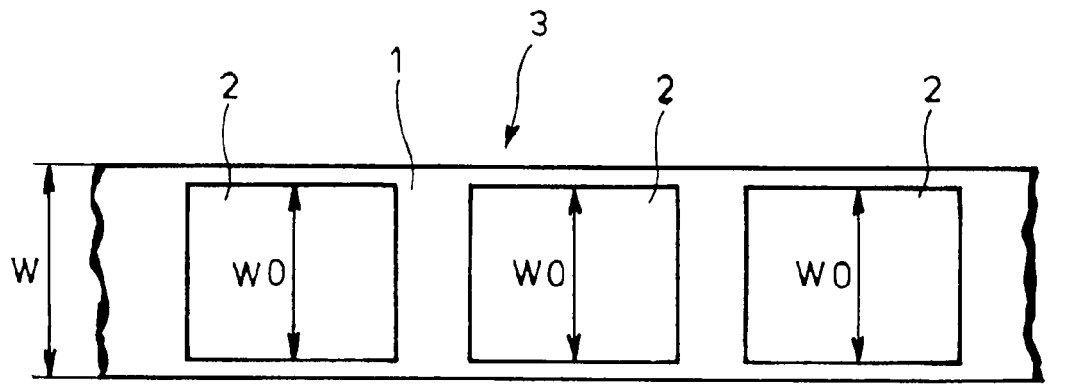
FIG. 1 A plan view showing a conventional cell electrode plate and a conventional process for producing the same.
Figure 2:
FIG. 2 A view looking in the direction of arrows II of FIG. 1.
Figure 3:
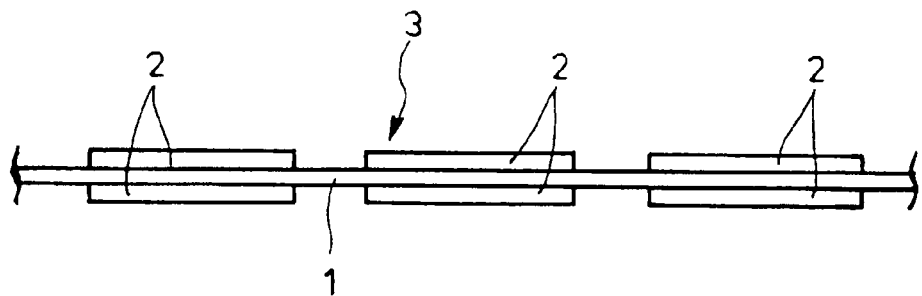
FIG. 3 A side view showing pressing state of the cell electrode plate by a roll press machine.
Figure 3:
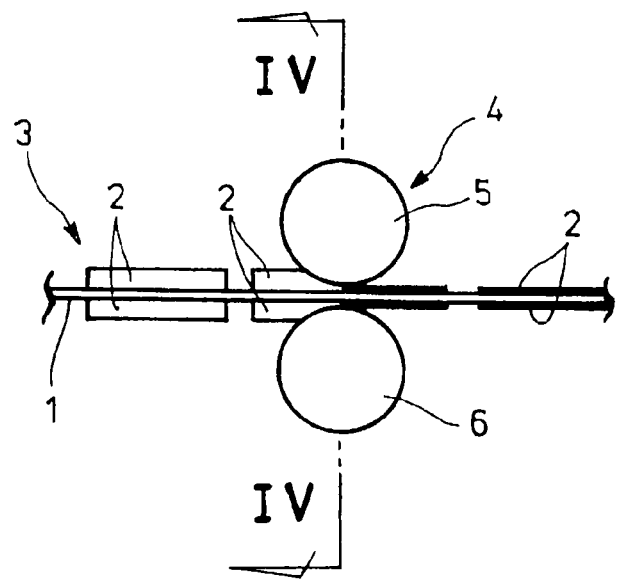
Figure 4:
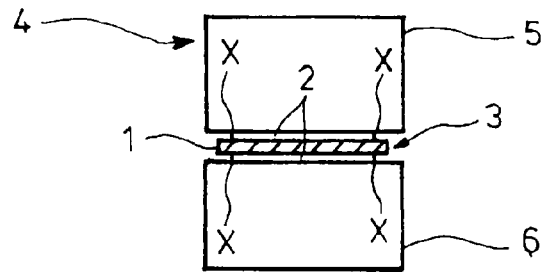
FIG. 4 A view looking in the direction of arrows IV of FIG. 3.
Figure 5:
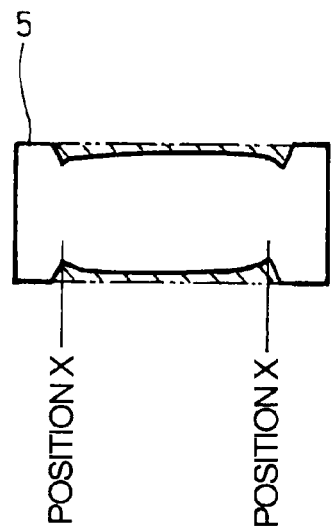
FIG. 5 A typical diagram showing worn state of press rolls of a roll press machine when pressing is conducted by the machine shown in FIGS. 3 and 4.
Figure 6:
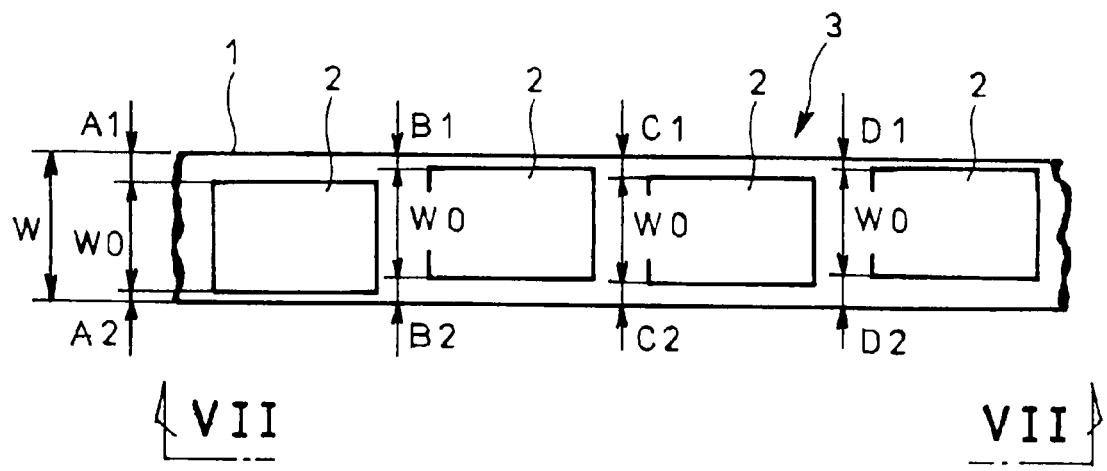
FIG. 6 A plan view showing an embodiment of a cell electrode plate and a process for producing the same according to the invention.
Figure 7:
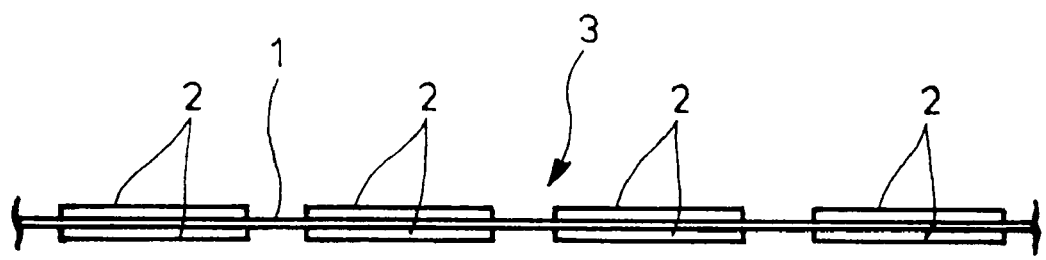
FIG. 7 A view looking in the direction of arrows VII of FIG. 6.

FIGS. 6 and 7 show an embodiment of the invention in which parts similar to those shown in FIGS. 1 and 2 are represented by the same reference numerals. A fundamental structure of the embodiment is substantially the same as that of a conventional one. The embodiment resides in that, as shown in FIG. 6, a plurality of sheets of electrode active material 2 applied discontinuously on and longitudinally of a core member 1 made of metal foil have widthwise ends along the width of the core member 1 which are different in position.

In FIG. 6, the band-like core member 1 has width W and all of the sheets of electrode active material 2 applied discontinuously on and longitudinally of the core member 1 on the upper and lower surfaces of the core member 1 have uniform width W0. However, distances between one widthwise ends of the respective sheets of electrode active material 2 and a corresponding one widthwise end of the core member 1 are A1, B1, C1 and D1 which are different from each other; distance between the other widthwise ends of the respective sheets of electrode active material 2 and a corresponding other end of the core member 1 are A2, B2, C2 and D2 which are also different from each other. The electrode active material 2 may be applied on either of upper and lower surfaces of the core member 1.

In FIG. 6, the distances between the one widthwise end of the core member 1 and the corresponding one widthwise ends of the sheets of electrode active material 2 have relationships A1>B1, B1<C1 and C1>D1 while the distances between the other widthwise end of the core member 1 and the corresponding other widthwise ends of the sheets of electrode active material 2 have relationships A2<B2, B2>C2 and C2<D2. The distances A1, B1, C1 and D1 and A2, B2, C2 and D2 are all within trimmed distance upon trimming at the opposite ends of the core member 1 after pressing of the cell electrode plate 3. Therefore, after the trimming, all of the distances A1, B1, C1 and D1 and A2, B2, C2 and D2 become zero. That is, after the trimming, the core member 1 becomes having the sheets of electrode active material 2 applied all over its width and there is no portion only of the core member 1 widthwise of the cell electrode plate 3.

The distances between the widthwise ends of the core member 1 and the corresponding widthwise ends of the sheets of electrode active material 2 may be different all over the sheets of electrode active material 2 in a lot; alternatively, a group of sheets of electrode active material 2 with different distances between their widthwise ends and corresponding widthwise ends of the core member 1 may be repeatedly arranged longitudinally of the core member 1. Alternatively, the respective sheets of electrode active material 2 may have different widths W0 so as to differentiate the distances between the widthwise ends of the core member 1 and the corresponding widthwise ends of the sheets of electrode active material 2.

According to the embodiment, when the cell electrode plate 3 with the core member 1 made of metal foil and electrode active material 2 applied thereon is pressed by the roll press machine, the widthwise ends of the sheets of electrode active material 2 abut on the press rolls at positions different along the axes of the press rolls. As a result, the worn amount of the press rolls by the widthwise ends of the sheets of electrode active material 2 become less, so that the service life of the press rolls can be prolonged. Thus, the number and/or amount of grinding the press rolls is reduced to reduce the roll maintenance cost and enhance the production efficiency.

Figure 8:
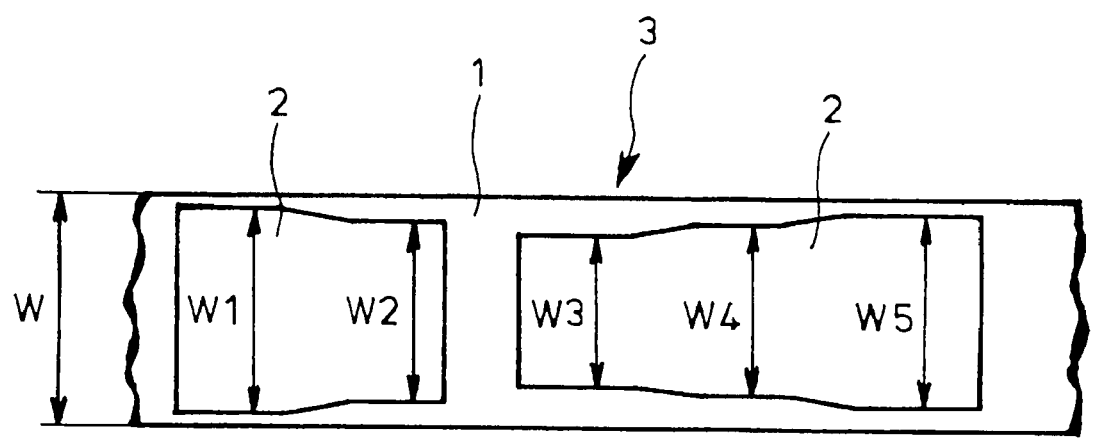
FIG. 8 A plan view showing a further embodiment of a cell electrode plate and a process for producing the same according to the invention.

FIG. 8 shows a further embodiment of the invention. In the embodiment, each of some sheets of electrode active material 2 arranged longitudinally of the core member 1 has one and the other ends longitudinally of the core member and with widths W1 and W2, respectively, and each of the other sheets of electrode active material 2 arranged longitudinally of the core member 1 has one end, an intermediate portion and the other end longitudinally of the core member and with widths W3, W4 and W5, respectively, so that the distances between the widthwise ends of the core member 1 and the corresponding width ends of the sheets of electrode active material 2 are different with respect to the respective widths W1-W5. In this embodiment, there are relationships W1>W2 and W3<W4<W5.

Also in this embodiment, the electrode active material 2 may be applied one or both of the upper and lower surfaces of the core member 1. The embodiment has the similar effects and advantages as those in the above-mentioned embodiment.

Figure 9:
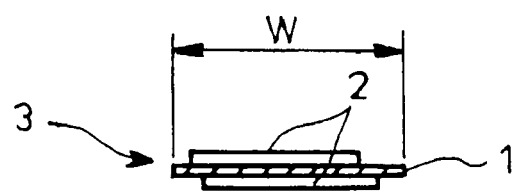
FIG. 9 A sectional view showing a still further embodiment of a cell electrode plate and a process for producing the same according to the invention.

FIG. 9 shows a still further embodiment of the invention in which the sheets of electrode active material 2 applied oppositely on the upper and lower surfaces of the core member 1 have widthwise end positions mutually offset along the width of the core member 1. Also in this embodiment, the sheets of electrode active material 2 on the upper and lower surfaces of the core member 1 may have uniform width or may have different widths. Alternatively, the sheets of electrode active material 2 on the upper and lower surfaces of the core member 1 may have the same width at some positions longitudinally of the cell electrode plate 3 and they may have different widths at the other positions longitudinally of the cell electrode plate 3. It is preferable that this embodiment is combined with the embodiment shown in FIG. 6 or 8. The present embodiment also has the same effects and advantages as those in the above-mentioned previous embodiments.

It is to be understood that a cell electrode plate and a process for producing the same according to the invention are not limited to the embodiments mentioned above and that various changes and modifications may be made without departing from the gist of the invention. For example, the invention may be applied to either of cell positive and negative electrodes.

INDUSTRIAL APPLICABILITY

A cell electrode plate and a process for producing the same according to the invention may be applied to production of cell electrode plates in such a manner that maintenance cost for rolls may be decreased and that production efficiency is improved.

The invention claimed is:

1. A process for producing a cell electrode plate, comprising:
   providing a band-like core member made of metal foil; and
   applying, discontinuously, a plurality of sheets of electrode active material on at least one of upper and lower surfaces of the core member, wherein
   mutually adjacent sheets of the electrode active material have mutually different end positions in a width direction of the core member to thereby provide the sheets of electrode active material on the core member, the width direction being a direction that is perpendicular to a longitudinal direction of the core member, which is a direction of feeding the core member to press rolls.

2. A process for producing a cell electrode plate, comprising:
   providing a band-like core member made of metal foil; and
   applying, discontinuously, a plurality of sheets of electrode active material on at least one of upper and lower surfaces of the core member, wherein
   a predetermined sheet or sheets of the electrode active material respectively has one and other ends longitudinally of the core member which have different widths in a width direction of the core member to thereby provide the sheets of electrode active material on said core member, the width direction being a direction that is perpendicular to a longitudinal direction of the core member, which is a direction of feeding the core member to press rolls.

3. A process for producing a cell electrode plat; comprising:
   providing a band-like core member made of metal foil; and
   applying, discontinuously, a plurality of sheets of electrode active material on upper and lower surfaces of the core member, wherein
   the sheets of electrode active material applied oppositely on the upper and lower surfaces of the core member have different end positions widthwise in a width direction of the core member to thereby provide the sheets of electrode active material on said core member, the width direction being a direction that is perpendicular to a longitudinal direction of the core member, which is a direction of feeding the core member to press rolls.

4. The process according to claim 3, further comprising:
   pressing the sheets of electrode active material with the press rolls; and
   trimming, after the pressing, end portions of the sheets and the core member so that the sheets and the core member have common end positions in the width direction of the core member.

5. The process according to claim 1, further comprising:
   pressing the sheets of electrode active material with the press rolls; and
   trimming, after the pressing, end portions of the sheets and the core member so that the sheets and the core member have common end positions in the width direction of the core member.

6. The process according to claim 2, further comprising:
   pressing the sheets of electrode active material with the press rolls; and
   trimming, after the pressing, end portions of the sheets and the core member so that the sheets and the core member have common end positions in the width direction of the core member.

* * * * *